July 17, 1928.
G. H. FORSYTH
DISK WHEEL
Filed July 11, 1921
1,677,755
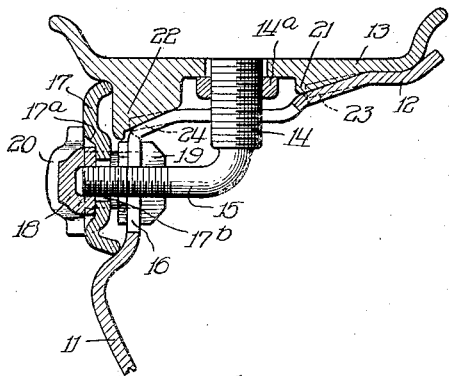
Witness:
P. Burkhardt
Inventor
George H. Forsyth
By Cromwell, Grist & Warden
attys.

Patented July 17, 1928.

1,677,755

UNITED STATES PATENT OFFICE.

GEORGE H. FORSYTH, OF HARVEY, ILLINOIS, ASSIGNOR, BY MESNE ASSIGNMENTS, TO STEEL WHEEL CORPORATION, OF LANSING, MICHIGAN, A CORPORATION OF MICHIGAN.

DISK WHEEL.

Application filed July 11, 1921. Serial No. 484,008.

This invention has to do with vehicle wheels of the type embodying the use therewith of demountable tire-carrying rims, and has for its principal objects the provision in such wheels of means for securing an efficient driving interlock between the demountable rim and the fixed rim or felly, the accurate positioning of the tire and its valve stem relative to the wheel to safeguard against shearing, the mounting of the valve stem to support the same and to give ready access thereto for inflation and to facilitate mounting and demounting the tire-carrying rim, a resilient stressing of the disk wheel body and felly by the rim, rim assembling means actuated in common and acting to secure uniform lateral adjustment of the rim retaining members, and other advantageously functioning features which will be made apparent from the following detailed description of preferred and alternative embodiments shown, by way of illustration only, and not by way of limitation, in the accompanying drawings, wherein—

Fig. 1 is a sectional detail view illustrating the employment of a valve stem angularly offset in connection with a felly and rim interlocked:

Fig. 2 is a similar view illustrating a form of flexible coupling between the valve stem and the filling nipple carried by the disk of the wheel;

Fig. 3 is a detail sectional view through a construction designed for the uniform positioning of the rim upon the felly from a common point;

Fig. 4 is a fragmentary rear elevation of that form of construction shown in Fig. 3;

Fig. 5 is a sectional detail view illustrating the interlocking and stressing relations between the rim and felly; and Fig. 6 is a fragmentary elevation on a reduced scale of the construction shown in Fig. 5.

Having reference to the drawings by way of illustration, in Fig. 1 is illustrated a portion of a single disk wheel body 11 having its peripheral portion offset to form a felly 12 extending at an inclination to the horizontal and adapted to receive a pneumatic tire-carrying rim 13. While the tire is omitted from the illustration, the usual valve stem is indicated at 14 clamped to the rim by the jam nut 14$^a$ and having an offset portion 15 which extends to the front face of the wheel through a slot 16 in the disk and also through the tire positioning clip or ring 17 upon the outer face of which it is provided with a cap 18. The tire-retaining member 17 is here shown as a ring which is locally recessed at 17$^a$ for the seating of the caps 18 and apertured at 17$^b$ to allow for play of the valve stem portion 15. This clip or ring is mounted as shown to effect a lateral bearing upon the rim 13 by means of adjusting bolts 19 with nuts 20. It will be observed that slot 16 extends from a point on the wheel disk inside of the valve stem to a point on the felly at the rear of the valve stem opening, thus enabling the rim and valve stem to be moved laterally of the wheel when the nuts 20 are removed, without having to withdraw the valve stem axially as is usually the case, and without disturbing the lock nut 14$^a$.

As shown in Fig. 1, the felly is provided at intervals with spring tongues bearing outwardly against the beveled surfaces of the inclined ribs 21 and 22 of the rim, the position of these tongues when unstressed being shown in dotted lines at 23 and 24 in said figure.

In Fig. 2 of the drawing, the usual straight valve stem 25 is shown as extending through an aperture 26 in the felly, which valve stem is provided with the usual valve inside. A filling nipple 27 is provided with a shoulder 28 bearing upon the rear face of the disk 29 and extending through the same to the front of the disk where it is provided with a threaded cap 30. Threaded on the nipple of the valve stem between the shoulder 28 and the closure cap 30 is a bushing having a flange, the tightening of the bushing serving to lock the stem in position relative to the disk by clamping the latter between the shoulder 28 and the flange of the bushing. An adjustable tube 31 is clipped over the outer end of the valve stem and over the filling nipple, being frictionally held thereon by means of binding wires or the like 32 and 33. Within that end of the tube adjacent the valve stem is a cored plug 34 centrally apertured at 35, and within the cored plug is a floating plate 36 eccentrically provided with an aperture 37 and springpressed by means of the compression spring 38 in a direction towards the valve and tending to unseat the valve inside by bearing upon the teat 39 thereof.

It will be observed that in case of accident serving to strip the tube 31 from the valve stem 25, the cored plug will come away from the tube, relieving the valve from the pressure of the plate 36 and permitting the valve inside to seat.

In Fig. 3 of the drawings and also in Fig. 4 thereof is illustrated a form of construction in which the demountable rim is adapted to be uniformly positioned upon the felly about the periphery of the wheel by means acting thereon and actuated from a single point. Here the demountable rim 40 is acted upon by means of positioning and retaining clips 41 which bear upon the rim 40 through the intermediary of a locking ring 42. The upper edge of the clips, which instead of being individual, may be consolidated in an annulus, integral or segmental as in Fig. 6 underlies and is closely adjacent the inner side of the grooved overhang 40ᵃ of the rim, whereby they are guided, and dirt is excluded where an annulus is used. These clips 41, if individual, are distributed about the circumference of the wheel in the usual manner or, if an annulus, it is apertured or slotted at intervals. A ring 43 extends around the wheel to the rear thereof, said ring being slotted as indicated at 44 at intervals corresponding to the disposition of apertures in the clips 41. Rivets or bolts 45 extend through the apertures of the clips and through the slots of the ring and have their heads bearing upon the rear face of the ring 43, said face of the ring being inclined to the general plane thereof adjacent the slots, thus forming cams upon which the heads of the rivets will ride. At one point about its inner circumference the ring 43 is provided with a rack 46, with which the rack meshes a pinion 47 carried upon a short shaft 48 which is journaled at one end in a bracket 49 and at its forward end in the disk 50 through which it projects to the front face thereof and is squared at 51 for engagement by a wrench or the like.

It will be clear that upon turning the shaft 48 by its squared end 51 the ring 43 will be caused to rotate and the cam faces 52 thereof will act upon the heads 45 of the rivets or bolts to draw the same rearwardly and cause the clips 41 to bear equally and simultaneously upon the rim through the ring 42 thus securing uniformity of adjustment laterally.

Where individual clips 41 are employed, they may be turned about the axis of the bolts 45 to bring them to and from a position bearing upon the face of the locking ring 42. If the clips 41 be consolidated in a single annulus, the apertures for the bolts 45 will be in the form of slots and the bolt heads elongated to enable them to be turned through an angle of 90°, whereby to withdraw the annulus from in front of the locking ring 42.

As shown in Figs. 3 and 4, the marginal portions 53 of the felly are slotted at intervals in order to receive tongues 54 of a peripheral band 55 within the recesses formed by said slots, the tongues 54 being formed by slotting the band 55. The tongues 56 are also thrown up from the band 55 for interlocking engagement within the recesses formed at corresponding intervals in the rim 57 upon the inner face of the rim 40. Thus is secured an effectual interlock between the rim and felly to prevent creeping of the rim upon the felly when in use.

In Fig. 5 of the drawings, as also in Fig. 6, a construction is shown embodying the wheel disk 60 slotted from the point 61 of the disk body to the point 62 of the felly to permit the valve stem 63 with its cap 64 to be withdrawn along with the rim laterally from the wheel when the retaining clips 65 are removed. In this form of construction, also, the felly is marginally notched or recessed at intervals indicated at 66, the rim 67 being likewise notched along its rear edge to provide tongues and recesses interlocking with the recesses and tongues of the felly. Herein, also, the constrictive band 68 is assembled with the felly and interlocked therewith by cooperating tongues and recesses along its marginal edge 69. The forward edge of the constrictive band 68 has spring tongues thrown up therefrom at intervals as indicated at 70 for enhancing the resilient stress resulting from the assembling of the rim therewith. Similarly, the clips 65 have spring tongues 71 thrown up therefrom to provide a spring reaction between the clips 65 and the rib 72 of the rim 67.

In this form of construction, as distinguished from that shown in Fig. 3, the clip bears directly upon the rim which is positioned thereby. Here also, in order to facilitate the assemblage of the same with the rim without interfering with the grooved overhang 73 of the rim, the clip 65 which is in the form of an annulus is segmental as clearly shown in Fig. 6, permitting the assemblage of the same piece-meal. Herein the clips 65 are arched and fulcrumed on the disk shoulder 60ᵃ and are adjustably assembled with the wheel body by means of bolts 74 inserted from the rear through polygonal apertures, the shank being of corresponding cross-section at 75 to prevent turning and upset at 76 to prevent accidental disassociation from the disk. Nuts 77 threaded on the bolts 74 bear upon bosses on the front face of the clip 65.

The slot in the disk between the points 61 and 62 not only enables the tire and stem to be removed laterally but also is of sufficient width to give ready access to the valve stem from the front for inflating.

I claim:

1. In a wheel, the combination with the wheel body, the felly, and a demountable rim, of adjustable rim-positioning and retaining clips bearing laterally on the rim at divers points about the circumference of the wheel, an adjusting ring rotatable concentrically of the wheel and circumferentially slotted and provided with cam surfaces at intervals corresponding to the clips, bolts connected to the clips and to the ring within the slots with the bolt heads bearing on the cam surfaces, whereby simultaneously to press the clips against the rim to position the same on the felly uniformly throughout as the ring is rotated.

2. In a wheel, the combination with the wheel body, the felly, and a demountable rim, of adjustable rim-positioning and retaining clips circumferentially fixed relative to the wheel and bearing laterally on the rim at divers points about the circumference of the wheel, an adjusting ring circumferentially slotted and provided with cam surfaces at intervals corresponding to the clips, bolts connected to the clips and to the ring within the slots with the bolt heads bearing on the cam surfaces, and means operable from a single point to rotate the ring whereby simultaneously to press the clips against the rim to position the same on the felly uniformly throughout.

3. In a wheel, the combination with the wheel body, the felly, and a demountable rim, of adjustable rim-positioning and retaining clips bearing laterally on the rim at divers points about the circumference of the wheel, an adjusting ring circumferentially slotted and provided with cam surfaces at intervals corresponding to the clips, bolts connected to the clips and to the ring within the slots with the bolt heads bearing on the cam surfaces, and means to rotate the ring whereby simultaneously to press the clips against the rim to position the same on the felly uniformly throughout, said means comprising a manually operable pinion engaging with a toothed rack on the ring.

In witness whereof I have hereunto signed my name.

GEORGE H. FORSYTH.